United States Patent
Aoki et al.

(10) Patent No.: US 7,067,969 B2
(45) Date of Patent: Jun. 27, 2006

(54) PLASMA DISPLAY UNIT INCLUDING LANTHNUM SUBSTITUTED ALUMINATE PHOSPHOR

(75) Inventors: Masaki Aoki, Osaka (JP); Hiroyuki Kawamura, Osaka (JP); Kazuhiko Sugimoto, Kyoto (JP); Mitsuhiro Otani, Osaka (JP); Hiroshi Setoguchi, Osaka (JP); Junichi Hibino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 346 days.

(21) Appl. No.: 10/485,149

(22) PCT Filed: May 15, 2003

(86) PCT No.: PCT/JP03/06046

§ 371 (c)(1),
(2), (4) Date: Jan. 29, 2004

(87) PCT Pub. No.: WO03/097766

PCT Pub. Date: Nov. 27, 2003

(65) Prior Publication Data

US 2004/0183438 A1 Sep. 23, 2004

(30) Foreign Application Priority Data

May 17, 2002 (JP) ............................. 2002-142658

(51) Int. Cl.
*H01J 1/62* (2006.01)
*H01J 17/49* (2006.01)
*C09K 11/80* (2006.01)

(52) U.S. Cl. ...................... 313/486; 313/582; 313/485; 252/301.4 R

(58) Field of Classification Search ........ 313/485–486, 313/582, 503; 252/301.4 R
See application file for complete search history.

(56) References Cited

U.S. PATENT DOCUMENTS

| 5,350,971 A | 9/1994 | Jeong |
| 6,614,165 B1* | 9/2003 | Aoki et al. .................. 313/485 |
| 2004/0051440 A1* | 3/2004 | Sugimoto et al. ........... 313/486 |

FOREIGN PATENT DOCUMENTS

| EP | 0 697 453 | 2/1996 |
| JP | 59-102979 | 6/1984 |

OTHER PUBLICATIONS

"Phosphor Handbook", p. 219-220, published from Ohm Co., Ltd. on Dec. 25, 1987 with partial translation.
H. Kijima, "Crystal Structure and Degradation Mechanism of Blue Phosphor", Display and Imaging, 1999, vol. 7, pp. 225-234.

(Continued)

*Primary Examiner*—Karabi Guharay
(74) *Attorney, Agent, or Firm*—Wenderoth, Lind & Ponack, L.L.P.

(57) ABSTRACT

A blue phosphor composing a blue phosphor player in a plasma display device has a crystal structure of $Ba_{(1-x)}Eu_xMgAl_{10}O_{17}$ or $Ba_{(1-x-y)}Eu_xSr_yMgAl_{10}O_{17}$. In this blue phosphor, La substitutes for a proportion of Ba or Sr so as to achieve a high-luminance plasma display device with less luminance deterioration in panel manufacturing processes.

11 Claims, 5 Drawing Sheets

OTHER PUBLICATIONS

Hajime Yamamoto, "Phosphors For Next-Generation Display Devices", Applied Physics, vol. 70, No. 3 (2001), pp. 309-312 with partial translation.

M. Shiiki et al., "Thermal degradation of PDP phosphors", Technical Report of IEICE. EID99-94 (Jan. 2001), pp. 117-122.

* cited by examiner

PLASMA DISPLAY UNIT INCLUDING LANTHNUM SUBSTITUTED ALUMINATE PHOSPHOR

TECHNICAL FIELD

The present invention relates to plasma display devices which have a phosphor layer that emits light as a result of being excited by ultraviolet rays, and which are employed in television sets for displaying images.

BACKGROUND ART

Plasma display devices using plasma display panels (PDPs), which have the advantages of being large, thin, and lightweight, are a subject of increasing interest as color display devices for computers and television sets.

A plasma display device additively mixes three primary colors to give a full-color display by means of a phosphor layer that emits light in three primary colors: red (R), green (G), and blue (B). Ultraviolet rays generated in discharge cells of the PDP excite the phosphor particles constituting this phosphor layer such that they emit visible light of each color.

The chemical compounds used in the phosphor of each color mentioned above are $(YGd)BO_3:Eu^{3+}$ and $Y_2O_3:Eu^{3+}$ which emit red light, $Zn_2SiO_4:Mn^{2+}$ which emits green light, and $BaMgAl_{10}O_{17}:Eu^{2+}$ which emits blue light. Phosphors are manufactured by mixing predetermined materials, and then firing the mixture at above 1,000 °C. to induce a solid-phase reaction (refer to Ohmsha's Phosphor Handbook, pp. 219–220). The phosphor particles made by firing are ground and screened (classified). The average particle diameter of red and green phosphors is 2 μm to 5 μm and the average particle diameter of blue phosphor is 3 μm to 10 μm.

Phosphor particles are ground and screened (classified) for the following reasons. Normally, phosphor particles for each color are made into paste and screen-printed, or phosphor ink is dispensed from a thin nozzle using the ink-jet process to form the phosphor layer on the PDP. Accordingly, a smooth layer is achievable by the use of small and uniformly sized phosphor particles (even particle size distribution) when the paste is applied. In other words, a smaller phosphor particle diameter, a more even shape, and closer to that of a sphere achieve a smoother application surface. This improves the packing density of the phosphor particles in the phosphor layer, increases the light-emitting surface of particles, and also minimizes the risk of unstable address driving. As a result, the luminance of the plasma display device can theoretically be improved.

However, in practice, the use of phosphor particles with a smaller diameter increases the surface area of the phosphor and therefore of the risk of defects in the phosphor. This likely to cause more water, carbon dioxide, or hydrocarbon system organics attach to the phosphor surface. In particular, blue phosphor, in which divalent Eu ions in substances such as in $Ba_{(1-x)}MgAl_{10}O_{17}:Eu_x$ and $Ba_{(1-x-y)}Sr_yMgAl_{10}O_{17}:Eu_x$ are the luminescence center, has a layer crystal structure (e.g. Display and Imaging 1999, vol. 7, pp. 225–234). In this layer structure, oxygen (O) present near a layer containing a Ba atom (the Ba—O layer) has defects regardless of the particle diameter, and the number of defects increases with falling particle diameter (e.g. Applied Physics, vol. 70, No. 3, 2001, p. 310)

In addition, it is known that ultraviolet rays with wavelength 147 nm generated by discharge when driving the panel also cause defects in the phosphor (e.g. Technical Report EID 99-94, Jan. 27, 2000, Electronic Information and Communications Society). FIG. 6 is a schematic structure of the Ba—O layer in $BaMgAl_{10}O_{17}:Eu$ blue phosphor.

In a conventional blue phosphor, the occurrence of these defects is believed to cause degradation of luminance. More specifically, defects caused by ions generated when driving the panel that collide with the phosphor, and defects caused by ultraviolet rays of wavelength 147 nm are thought to degrade luminance.

DISCLOSURE OF INVENTION

A plasma display device of the present invention employs a plasma display panel which emits light when a phosphor layer is excited by ultraviolet rays. Discharge cells for single or multiple colors are disposed, and a color phosphor layer is disposed corresponding to each discharge cell in this plasma display panel. The phosphor layer has a blue phosphor layer, which has a crystal structure of $Ba_{(1-x)}Eu_xMgAl_{10}O_{17}$ (0<x<1) or $Ba_{(1-x-y)}Eu_xSr_yMgAl_{10}O_{17}$ (0<x<1,0<y<1 and 0<x+y<1). In this blue phosphor, La substitutes for a proportion of Ba or Sr.

In this plasma display device, trivalent La is present in a greater proportion in the crystal of $(Ba,Sr)EuMgAl_{10}O_{17}$ used for the blue phosphor, and thus the positive charge significantly increases. To counterbalance this significantly increased positive charge (to compensate for the charge), oxygen with a negative charge fills the oxygen defects near Ba element. As a result, the oxygen defects near the Ba—O layer can be reduced, preventing luminance deterioration during manufacturing processes and deterioration due to 147-nm ultraviolet rays.

DETAILED DESCRIPTION OF PREFERRED EMBODIMENT(S)

A plasma display device in a preferred embodiment of the present invention is described below with reference to drawings.

Figure 1:
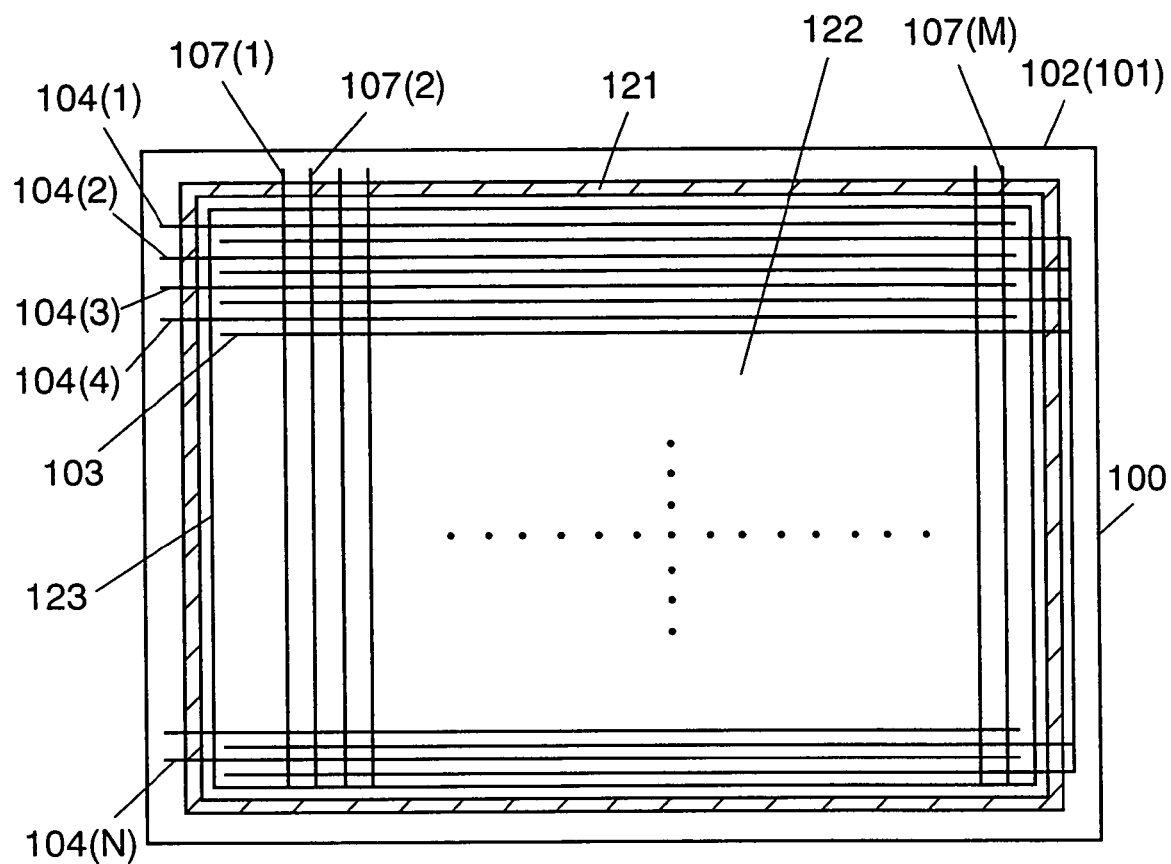
FIG. 1 is a plan view of a plasma display panel without a front glass substrate in a preferred embodiment of the present invention.
Figure 2:
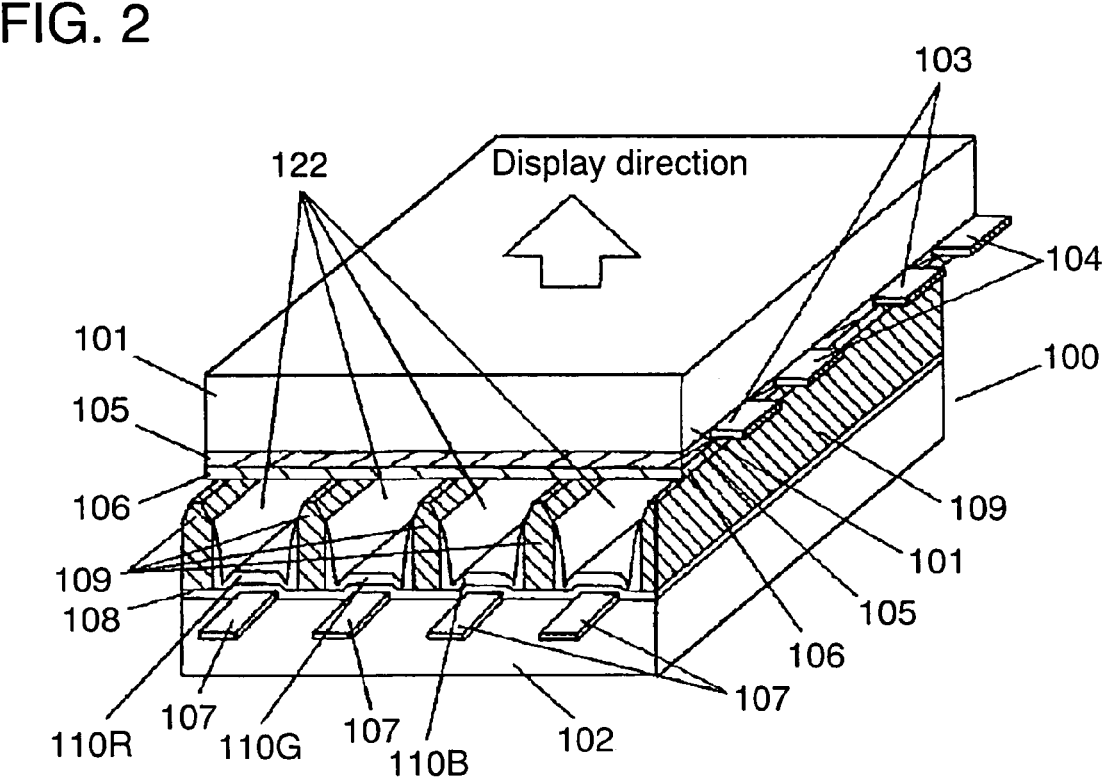
FIG. 2 is a perspective view illustrating a partial section of a fragmentary structure of an image display area in the plasma display panel in accordance with the preferred embodiment of the present invention.

FIG. 1 is a schematic plan view of a plasma display panel (PDP) without a front glass substrate. FIG. 2 is a perspective view illustrating a partial section of an image display area in the PDP. In FIG. 1, for easier understanding, some of electrodes in the display electrode group, display scanning electrode group, and address electrode group are omitted.

As shown in FIG. 1, PDP 100 includes front glass substrate 101 (not illustrated), rear glass substrate 102, N number of display electrodes 103, N number of display scanning electrodes 104 (the Nth electrode is indicated as an exact number), M number of address electrodes 107 (the Mth electrode is indicated by an exact number), and airtight sealing layer 121 indicated by the slanted line. PDP 100 also has an electrode matrix with a three-electrode structure comprising electrodes 103, 104, and 107. A cell is formed in an area where display electrode 103, display scanning electrode 104, and address electrode 107 cross. Moreover, PDP 100 has discharge space 122 and image display area 123.

As shown in FIG. 2, the front panel has display electrode 103, display scanning electrode 104, dielectric glass layer 105, and MgO protective layer 106 on one main face of front glass substrate 101. The rear panel has address electrode 107, dielectric glass layer 108, barrier rib 109, and phosphor layers 110R, 110G and 110B on one main face of rear glass substrate 102. PDP 100 is configured by attaching together the front panel and rear panel, and enclosing discharge gas in discharge space 122 created between the front panel and rear panel.

Figure 3:
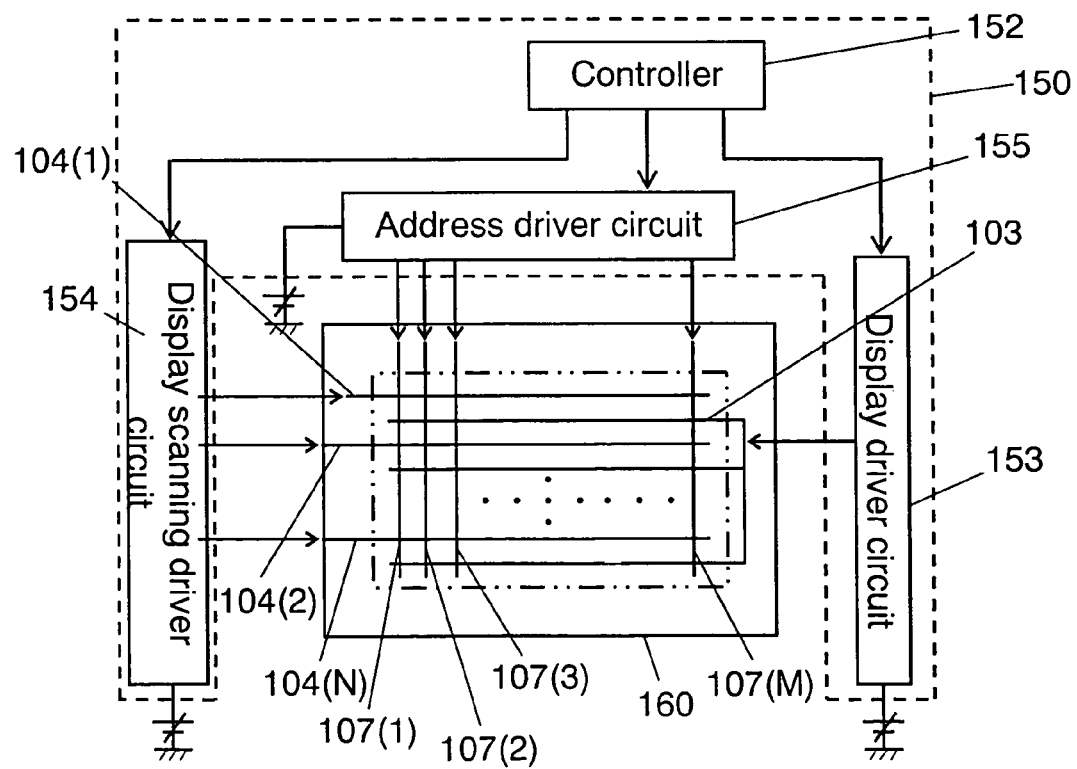
FIG. 3 is a block diagram of the plasma display device using the plasma display panel in accordance with the preferred embodiment of the present invention.

The plasma display device, as shown in FIG. 3, includes display driver circuit 153, display scanning driver circuit 154, and address driver circuit 155 configuring driving circuit unit 150 on PDP 160. In the cell to be turned, the voltage is applied to display scanning electrode 104 and address electrode 107, controlled by controller 152, and address discharge is executed between these electrodes. A pulse voltage is then applied between display electrode 103 and display scanning electrode 104 to provide maintenance discharge. This maintenance discharge generates ultraviolet rays in the cell to be turned on, and the phosphor layer is excited by these ultraviolet rays and emits light to turn on the cell. Images are displayed by turning on and off multiple color cells.

A method of manufacturing the abovementioned PDP is described next with reference to FIGS. 4 and 5.

The front panel is manufactured as described next. First, N number of display electrodes 103 and display scanning electrodes 104 (only two each are indicated in FIG. 2) are alternately formed in parallel in stripes. Then, display electrodes 103 and display scanning electrodes 104 are covered with dielectric glass layer 105, after which an MgO protective layer 106 is formed on the surface of the dielectric glass layer.

Display electrodes 103 and display scanning electrodes 104 are electrodes configured with a transparent electrode made of ITO and a bus electrode made of Ag. These electrodes are formed by first screen-printing silver paste for the bus electrode and then firing the paste.

Dielectric glass layer 105 is formed by screen-printing paste containing lead glass, and then firing the paste at a predetermined temperature for a predetermined time (e.g. at 560° C. for 20 minutes) to achieve a predetermined layer thickness (about 20 µm). The above paste containing lead glass material is, for example, a mixture of PbO (70 wt %), $B_2O_3$ (15 wt %), $SiO_2$ (10 wt %), $Al_2O_3$ (5 wt %), and organic binder (10% ethylcellulose dissolved in α-terpineol). The organic binder is resin dissolved in organic solvent. Resin such as acrylic resin can be used other than ethylcellulose, and butyl carbitol can also be used as organic solvent. In addition, a dispersing agent (such as glyceryl trioleate) can be mixed in the organic binder.

MgO protective layer 106 is made of magnesium oxide (MgO), and is formed into a predetermined thickness (about 0.5 µm) using sputtering and CVD (chemical vapor deposition).

The rear panel is formed by making lines of M number of address electrodes 107 by applying silver paste for electrodes by screen-printing or photography on rear glass substrate 102, and then firing the paste. Paste containing lead glass material is screen-printed on address electrodes 107 to form dielectric glass layer 108. Paste containing the same lead glass material is then repeatedly screen-printed at a predetermined pitch, and fired to form barrier ribs 109. These barrier ribs 109 divide discharge space 122 into cells (unit light-emitting region) along the lines.

Figure 4:
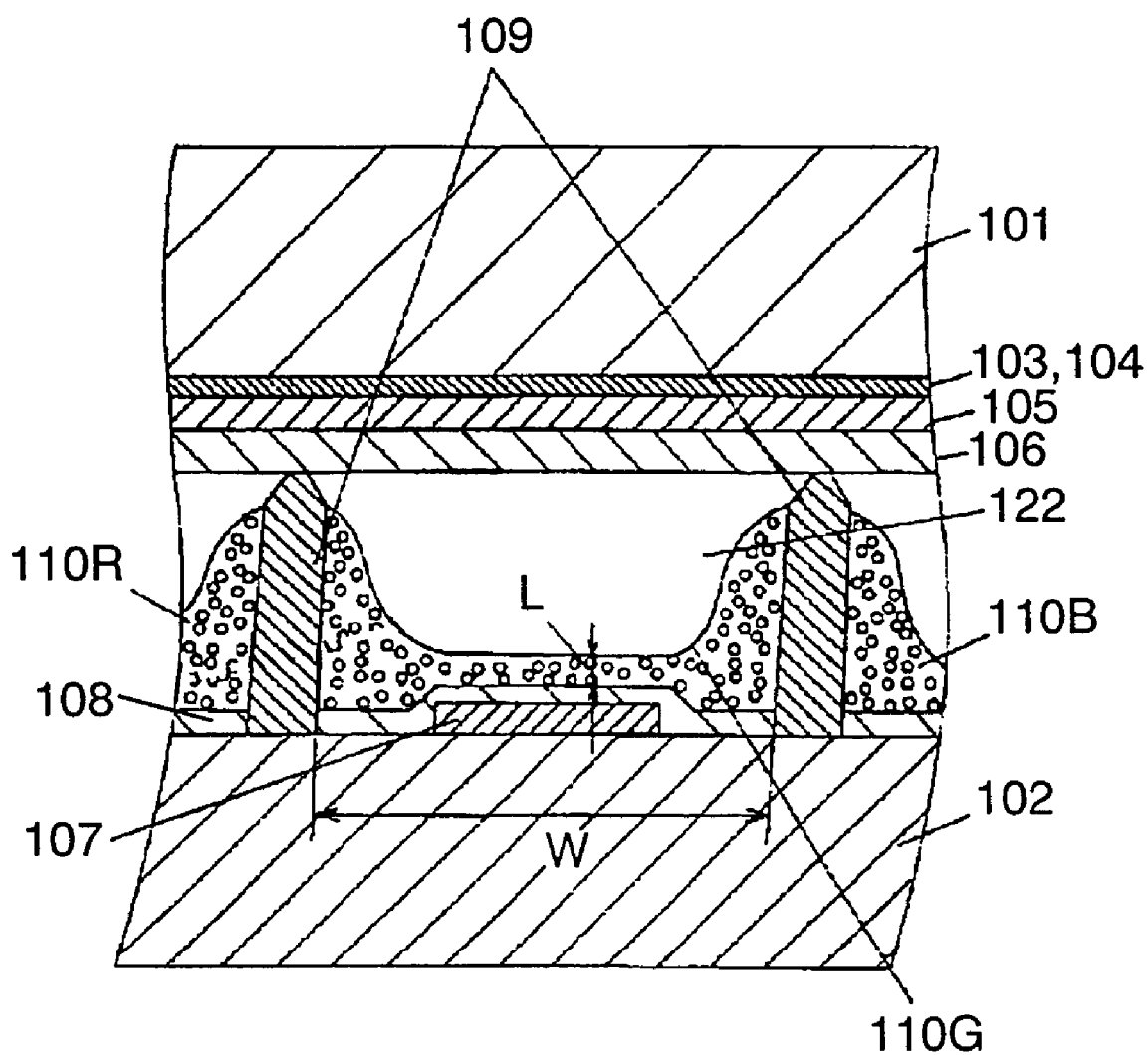
FIG. 4 is a sectional view illustrating a structure of the image display area of the plasma display panel in accordance with the preferred embodiment of the present invention.

FIG. 4 shows a fragmentary sectional view of PDP100. As shown in FIG. 4, the gaps in barrier ribs 109 are specified as about 130 µm to 240 µm in accordance with a 32 to 50 inch HDTV. Phosphor layers 110R, 110G, and 110B made of red (R) phosphor, green (G) phosphor, and blue (B) phosphor are formed in a groove between barrier ribs 109. More specifically, phosphor ink paste made of particles of each phosphor and organic binder is applied, and fired at 400° C. to 590° C. to incinerate the organic binder and form phosphor layers 110R, 110G, and 110B by binding the particles of each phosphor. Blue (B) phosphor is $Ba_{(1-y-z)}Eu_yLa_zMgAl_{10}O_{17}$ or $Ba_{(1-x-y-z)}Eu_xSr_yLa_zMgAl_{10}O_{17}$ in which La substitutes for a proportion of Ba. Trivalent Eu ion substitutes for a proportion of divalent Eu ions. Thickness L in the laminating direction of these phosphor layers 110R, 110G, and 110B on address electrode 107 is preferably formed so as to achieve about 8 to 25 times the average particle diameter of each color phosphor particle. In other words, phosphor particles are laminated to a thickness of at least 8 layers and preferably to a thickness of about 20 layers to secure luminance (luminous efficiency) when the phosphor layer is irradiated by predetermined ultraviolet rays. This is because the phosphor layer passes through the ultraviolet rays generated in the discharge space without absorbing the rays. If the phosphor particles have a thickness greater than 20-layer lamination, the luminous efficiency of the phosphor layer is mostly saturated. In addition, sufficient discharge space 122 becomes difficult to be secured if the thickness is greater than that created by 20-layer lamination. The use of spherical and sufficiently small phosphor particles, made such as by the hydrothermal synthesis, allows greater packing density of the phosphor layer than of non-spherical particles for an equivalent number of laminated layers. The total surface area of phosphor particles also increases, and thus the phosphor particle surface area which practically contributes to light emission in the phosphor layer increases, further improving luminous efficiency. Synthesis of phosphor layers 110R, 110G, and 110B and a method of manufacturing blue phosphor particles used for the blue phosphor layer, in which trivalent Eu ions substitute for divalent Eu ions, are described later.

The front panel and rear panel, manufactured as described above, are assembled in a way such that each electrode on the front panel and address electrodes 107 on the rear panel cross orthogonally. Sealing glass is placed on the periphery of the panel, and fired at about 450° C. for 10 to 20 minutes, for example, to form an airtight sealing layer 121 (FIG. 1) so that the panel periphery is sealed. Discharge space 122 is once evacuated to a high vacuum (e.g. $1.1 \times 10^{-4}$ Pa), and then discharge gas (e.g. He—Xe system or Ne—Xe system inert gas) is injected to a predetermined pressure to complete PDP 100.

Figure 5:
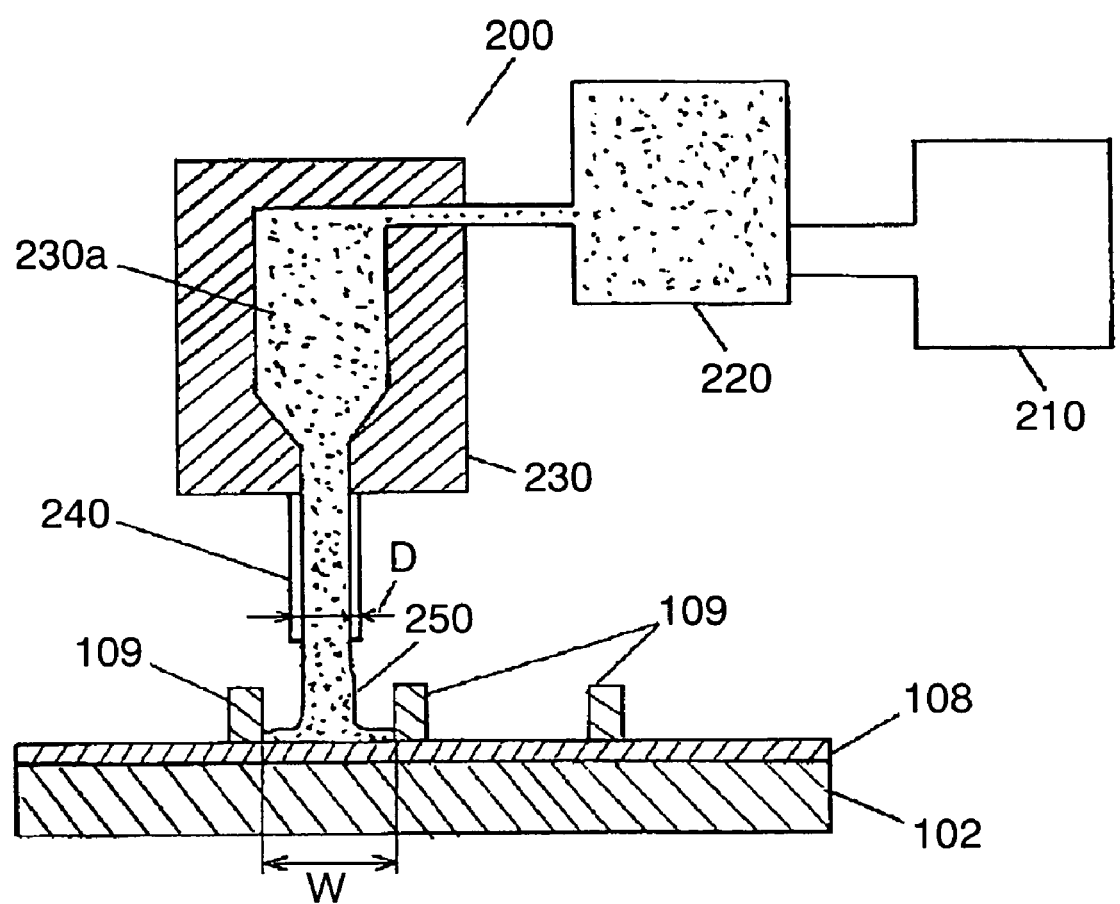
FIG. 5 is a schematic diagram of an ink applicator used for forming a phosphor layer on the plasma display panel in accordance with the preferred embodiment of the present invention.
Figure 6:
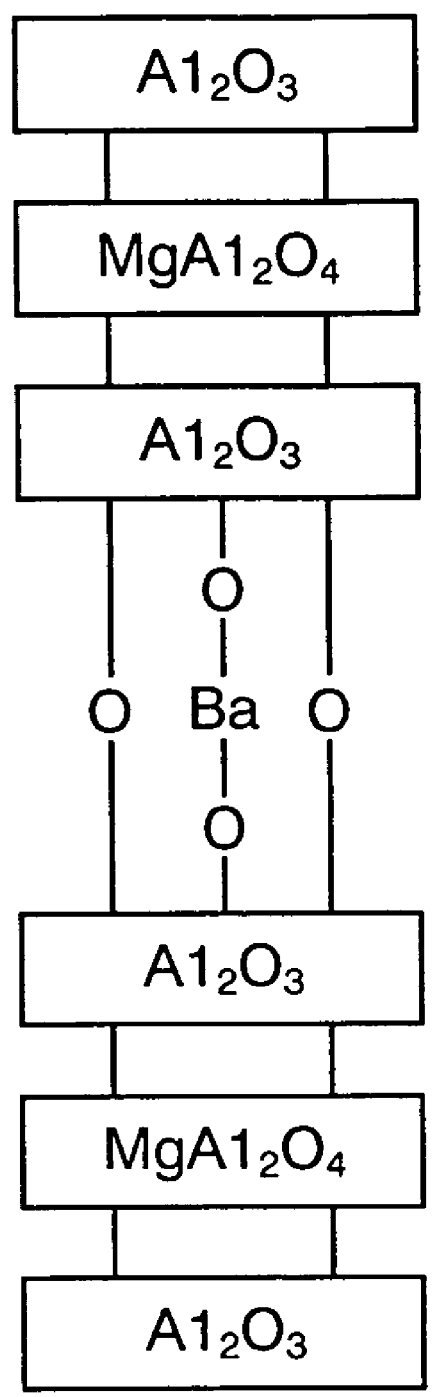
FIG. 6 is a schematic structure illustrating an atomic structure of conventional blue phosphor.

FIG. 5 is a schematic diagram of an ink applicator used in forming the phosphor layer. As shown in FIG. 5, ink applicator 200 includes server 210, pressing pump 220, and header 230. The phosphor ink supplied from server 210, which stores the phosphor ink, is pressurized and supplied to header 230 by pressing pump 220. Ink chamber 230a and nozzle 240 (inner diameter: 30 µm to 120 µm) are provided on header 230, and the phosphor ink, pressurized and supplied to ink chamber 230a, is continuously dispensed from nozzle 240. Diameter D of this nozzle 240 is preferably greater than 30 µm to prevent the nozzle clogging, and smaller than gap W (about 130 µm to 200 µm) between barrier ribs 109 to prevent overflowing from barrier ribs during application. In general, diameter D is thus set between 30 µm and 130 µm.

Header 230 is configured to be linearly driven by a header scanning mechanism (not illustrated). The phosphor ink is uniformly applied to the groove between barrier ribs 109 on rear glass substrate 102 by scanning header 230 and continuously dispensing phosphor ink 250 from nozzle 240. The viscosity of the phosphor ink used is maintained between 1500 and 3000 CP (centipoise) at 25° C. If required, materials such as surface active agents, silica, and dispersing agent (0.1 to 5 wt %) can also be added.

An agitator (not illustrated) is provided on aforementioned server 210 to prevent sedimentation of particles in the phosphor ink. Header 230 is manufactured by integrally molding ink chamber 230a and nozzle 240, and by machining or electric spark machining metal materials.

Methods of forming the phosphor layer are not limited to the above method. For example, photolithography, screen-printing, methods of applying a film in which phosphor particles are mixed, and various other methods are similarly applicable.

As for the red phosphor mixed in the phosphor ink, a chemical compound of $(Y, Gd)_{1-x}BO_3:Eu_x$ or $Y_{2-x}O_3:Eu_x$ is used. These are compounds in which Eu substitutes for a proportion of Y element composing the ground material. Substitution amount x of europium in relation to Y element is preferably $0.05 \leq x \leq 0.20$. If the substitution amount exceeds this level, a significant deterioration of luminance occurs in spite of high luminance being achieved, hindering practical use. On the other hand, if the substitution amount is below this level, the composition ratio of Eu, which is the luminescence center, decreases, preventing its use as phosphor due to low luminance.

As for the green phosphor, a chemical compound of $Ba_{1-x}Al_{12}O_{19}:Mn_x$ or $Zn_{2-x}SiO_4:Mn_x$ is used. $Ba_{1-x}Al_{12}O_{19}:Mn_x$ is a compound in which Mn element substitutes for a proportion of Ba element composing the ground material, and $Zn_{2-x}SiO_4:Mn_x$ is a compound in which Mn substitutes for a proportion of Zn element composing the ground material. Substitution amount x of Mn in proportion to Ba and Zn elements is preferably $0.01 \leq x \leq 0.10$ for the same reasons described above for the red phosphor.

The inventors of the present invention found that deterioration of luminance and color shifting occur not only due to presence of defects but also to the phosphor reacting with water when water or carbon dioxide gas selectively adsorbs to oxygen (O) defects near the Ba—O layer and ultraviolet rays or ions are applied to the compound in this condition in which water or carbon dioxide has been adsorbed. In other words, the inventors found that different kinds of deterioration occur as a result of water or carbon dioxide gas being adsorbed into oxygen defects near the Ba—O layer in the blue phosphor.

Based on this finding, the inventors aims to prevent deterioration of the blue phosphor in the panel manufacturing process and while driving the panel, without decreasing the luminance of the blue phosphor, by reducing oxygen defects near the Ba—O layer of the blue phosphor.

To reduce oxygen defects near the Ba—O layer, a substitution of La for a proportion of Ba or Sr element in the blue phosphor having the crystal structure of $BaMgAl_{10}O_{17}$:Eu or $BaSrMgAl_{10}O_{17}$:Eu is found to reduce oxygen defects without reducing luminance. In addition, a substitution of trivalent Eu ions for of a proportion of divalent Eu ions which replace Ba or Sr further significantly reduces oxygen defects near the Ba—O layer.

If lanthanum (La) is added to the crystal of $(Ba, Sr)MgAl_{10}O_{17}$:Eu which is the blue phosphor, La and Eu enter the divalent barium (Ba) or strontium (Sr) lattice. In general, the blue phosphor is manufactured by firing in a reducing atmosphere. Accordingly, europium (Eu) is present as a divalent positive ion as a result of reduction, and both trivalent and divalent La are present because La is difficult to reduce. If this blue phosphor is fired in an oxidative atmosphere, for example, trivalent Eu ions substitute for a proportion of the divalent Eu ions and most of the La ions convert to trivalent ions. This greatly increases the positive charge in the crystal. Trivalent Ba, Sr, and Eu, which all were previously divalent, increase, particularly in the Ba—O layer, by addition of La and oxidation of Eu. To counterbalance the significantly increased positive charge (to compensate for this charge), oxygen, which has a negative charge, fills the oxygen defects near Ba element. As a result, oxygen defects near the Ba—O layer can be assumed to be reduced.

The use of the phosphor of the present invention thus solves the problem of deterioration of luminance in manufacturing processes, deterioration caused by 147-nm ultraviolet rays, and nozzle clogging.

As for the blue phosphor, a chemical compound of $Ba_{(1-x-z)}Eu_xLa_zMgAl_{10}O_{17}$ or $Ba_{(1-x-y-z)}Eu_xSr_yLa_zMgAl_{10}O_{17}$ is used. $Ba_{(1-x-z)}Eu_xLa_zMgAl_{10}O_{17}$ and $Ba_{(1-x-y-z)}Eu_xSr_yLa_zMgAl_{10}O_{17}$ are compounds in which trivalent La and divalent Eu or divalent Sr substitute for a proportion of divalent Ba element composing the ground material. The substitution amounts of La, Sr, and Eu elements for Ba element is preferably $0.03 \leq x \leq 0.20$, $0.1 \leq y \leq 0.5$, and $0.01 \leq z \leq 0.2$ for the same reasons described above for the red phosphor. The substitution amount of trivalent Eu ions for divalent Eu ions is preferably $0.05 \leq a \leq 0.4$ when $BaEu(+2)_{1-a}Eu(+3)_aLaMgAl_{10}O_{17}$. In other words, ion content of divalent Eu ions is preferably 60% to 95%, and ion content of trivalent Eu ions is preferably 5% to 40%.

To reduce deterioration by ultraviolet rays and discharge, the substitution amount of La is preferably between 0.1% and 20%. If the La substitution amount is less than 0.1%, no apparent improvement is achievable. Contrarily, if the substitution amount exceeds 20%, luminance is reduced. In addition, if the ion content of the trivalent Eu ions is less than 5% of the total content of divalent and trivalent Eu ions, no prevention of luminance deterioration is achievable. On the other hand, an ion content exceeding 40% is not preferable because this results in reducing luminance of the phosphor. The fact that a proportion of divalent Eu ions is converted to trivalent Eu ions is confirmed through measurement using EXANES (X-ray Absorption Near Edge Structure) spectrum.

The blue phosphor particles, in which trivalent Eu ions substitute for a proportion of divalent Eu ions in $Ba_{(1-x-z)}Eu_xLa_zMgAl_{10}O_{17}$ and $Ba_{(1-x-y-z)}Eu_xSr_yLa_zMgAl_{10}O_{17}$, have a small particle diameter of 0.05 µm to 3 µm, and also show a good particle size distribution. If the shape of phosphor particles forming the phosphor layer is spherical, the packing density further improves, increasing the light-emitting area of phosphor particles which practically contributes to light emission. Accordingly, a plasma display device with improved luminance and good luminance characteristic in which deterioration of luminance and color shifting are suppressed is achievable.

The average particle diameter of phosphor particles is further preferably between 0.1 µm and 2.0 µm. With respect to particle size distribution, the maximum particle diameter is further preferably not greater than 4 times the average diameter and the minimum particle diameter is ¼ or more than the average diameter. The depth to which the ultraviolet rays reach into the phosphor particle is only a few hundreds of nanometers, and thus the phosphor particles mostly illuminate only on the surface. If the particle diameter of such phosphor particle is 2.0 µm or less, the surface area of particles contributing to the light emission increases, and the luminous efficiency of the phosphor layer is maintained at a high level. If the particle diameter is 3.0 µm or larger, a 20 µm or thicker phosphor layer is needed, resulting in an inability to secure sufficient discharge space. If the particle diameter is 0.1 µm or less, defects tend to occur, and thus luminance cannot be improved.

As for the binder mixed into the phosphor ink, ethylcellulose or acrylic resin (mixed to 0.1 to 10 wt % of the ink) can be used and α-terpineol or butylcarbitol can be used as solvents. High polymers such as PMA and PVA can also be used as the binder, and organic solvents such as diethylene glycol and methyl ether can also be used as solvents.

In this preferred embodiment, the phosphor particles are manufactured using solid-phase firing, aqueous solution process, atomization firing, or hydrothermal synthesis.

(1) Blue Phosphor $Ba_{(1-x-z)}Eu_xLa_zMgAl_{10}O_{17}$ manufactured using hydrothermal synthesis is described below.

First, in a solution mixing process, barium nitrate, $Ba(NO_3)_2$; magnesium nitrate, $Mg(NO_3)_2$; aluminum nitrate, $Al(NO_3)_3$; europium nitrate, $Eu(NO_3)_2$; and lanthanum nitrate, $La(NO_3)_3$ are mixed at the mole ratio that achieves the above chemical formulas ($0.03 \leq x \leq 0.25$ and $0.001 \leq z < 0.2$). The mixture is then dissolved in an aqueous medium to manufacture the liquid mixture. As the aqueous medium, ion-exchange water and pure water are preferable since they do not contain impurities, but water containing non-aqueous solvents (methanol, ethanol, etc.) is also acceptable for use.

Next, the liquid mixture is poured into a container made of corrosion-resistant and heat resistant material such as Au and Pt. Hydrothermal synthesis (12 to 20 hr) is conducted under a predetermined pressure (0.2 MPa to 10 MPa) at a predetermined temperature (100° C. to 300° C.) in a pressurized container using equipment for heating while applying pressure such as an autoclave.

The powder is then fired in a reducing atmosphere (for example, an atmosphere containing 5% $H_2$ and 95% $N_2$) at a predetermined temperature for a predetermined time (e.g. at 1350° C. for 2 hr). The fired powder is then classified to manufacture the phosphor. Next, to change a proportion of divalent Eu to trivalent Eu, this phosphor is fired at 350° C. to 900° C. in $O_2$, $O_2$—$N_2$, or $O_3$—$N_2$. This completes the manufacture of the intended blue phosphor $Ba_{(1-x-z)}Eu_xLa_zMgAl_{10}O_{17}$ in which trivalent Eu substitutes for a proportion of divalent Eu in the blue phosphor manufactured in the reducing atmosphere (most of the Eu in the blue phosphor manufactured in the reducing atmosphere is initially divalent). Here, a firing temperature lower than 350° C. is not sufficient to allow oxygen atom to enter and restore oxygen defects near the Ba—O layer. A firing temperature over 900° C. results in the generation of too many trivalent Eu ions, making the red luminance too distinctive. In addition, when firing the phosphor in $O_2$, $O_2$—$N_2$, or $O_3$—$N_2$, the degradation characteristic of the blue phosphor can be further improved by forming a protective film on the surface of the blue phosphor. More specifically, oxides such as $Al_2O_3$, $SiO_2$, and $La_2O_3$ or fluorides such as $LaF_2$ and $AlF_3$ are attached to the phosphor surface using organic compounds containing these elements (e.g. alkoxides or acetyl acetone) by hydrolysis (a method to hydrolyze an organic compound in a mixture of phosphor powder, alcohol, and organic compound on the phosphor surface, and then fire to remove alcohol content). The thickness of the coating of the protective film made of oxide or fluoride is preferably minimal, in light of the fact that ultraviolet rays need to pass through it. More specifically, the protective film is preferably 0.1 µm or thinner.

The phosphor particles obtained by hydrothermal synthesis are round, and are smaller in diameter (average particle diameter: about 0.05 µm to 2.0 µm) than those manufactured using conventional solid-phase reaction. The "round" shape here signifies that the diameter ratio (short diameter/long diameter) of most of phosphor particles is, for example, between 0.9 and 1.0, but it does not necessarily mean that all phosphor particles are within this range.

Furthermore, the blue phosphor can also be manufactured by using atomization, in which the hydrated liquid mixture is atomized from a nozzle, instead of pouring it in an Ag or Pt container, into a high-temperature furnace for synthesizing the phosphor, and then firing this blue phosphor in $O_2$, $O_2$—Ne, or $O_3$—$N_2$.

Next, $Ba_{(1-x-y-z)}Eu_xSr_yLa_zMgAl_{10}O_{17}$ is described. The difference with the above-described $Ba_{(1-x-z)}Eu_xLa_zMgAl_{10}O_{17}$ is the materials, and this phosphor is made using solid-phase firing. The materials used for this phosphor are described below.

Barium hydroxide, $Ba(OH)_2$; strontium hydroxide, $Sr(OH)_2$; magnesium hydroxide, $Mg(OH)_2$; aluminum hydroxide, $Al(OH)_3$; europium hydroxide, $Eu(OH)_2$; and lanthanum hydroxide, $La(OH)_3$ are weighed to achieve the required mole ratio and mixed with $AlF_3$ as flux. After firing the mixture in a reducing atmosphere (e.g. 5% $H_2$ and 95% $N_2$) at a predetermined temperature (1000° C. to 1600° C.) for two hours, the fired mixture is classified using an air classifier to manufacture blue phosphor powder. Then, to change a proportion of divalent Eu to trivalent Eu, the blue phosphor powder is fired in $O_2$, $O_2$—$N_2$, or $O_3$—$N_2$ to complete the blue phosphor in which trivalent Eu ions substitute for a proportion of divalent Eu ions.

With respect to the method of manufacturing the phosphor, the effect of substituting a proportion of Ba ions by La ions and substituting a proportion of divalent Eu ions by trivalent Eu ions in $BaEuMgAl_{10}O_7$ is revealed for the phosphor manufactured using any of solid-phase firing, aqueous solution process, atomization firing, and hydrothermal synthesis. Only a substitution of La for Ba or only a substitution of trivalent Eu for a proportion of divalent Eu is also effective, but substitutions of both La and trivalent Eu are further more effective.

(2) Green Phosphor

Next, $Zn_{2-x}SiO_4:Mn_x$ manufactured using atomization firing is described.

First, in the solution mixing process, zinc nitrate, $Zn(NO_3)$; silica nitrate, $Si(NO_3)_2$; and manganese nitrate, $Mn(NO_3)_2$ are mixed at a mole ratio of 2−x:1:x ($0.01 \leq x \leq 0.10$). This liquid mixture is then atomized in a furnace heated to 1500° C. from a nozzle while applying ultrasonic waves to complete the green phosphor.

Next, $Ba_{1-x}Al_{12}O_{19}:Mn_x$ manufactured using hydrothermal synthesis is described.

First, in the solution mixing process, barium nitrate, $Ba(NO_3)_2$; aluminum nitrate, $Al(NO_3)_2$; and manganese nitrate, $Mn(NO_3)_2$ are mixed at a mole ratio of 1−x:12:x ($0.01 \leq x \leq 0.10$). This mixture is then dissolved in ion-exchange water to manufacture the liquid mixture.

Next, in a hydration process, the basic aqueous solution (e.g. aqueous ammonia) is dripped to this liquid mixture to manufacture hydrate. Then, in a hydrothermal synthesis process, this hydrate and ion-exchange water are poured into a capsule made of corrosion-resistant and heat resistant material such as Pt and Au. Hydrothermal synthesis is conducted at a predetermined temperature under a predetermined pressure (e.g. at 100° C. to 300° C. under 0.2 MPa to 10 MPa) for a predetermined time (e.g. 2 to 20 hr) typically using an autoclave to complete a compound.

Then, this compound is dried to complete intended $Ba_{1-x}Al_{12}O_{19}:Mn_x$. The diameter of phosphor particles obtained using hydrothermal synthesis is 0.1 μm to 2.0 μm and round. This powder is annealed at 800° C. to 1100° C. in the air, and then classified to complete the green phosphor.

(3) Red Phosphor

Next, $(Y,Gd)_{1-x}BO_3:Eu_x$ manufactured using hydrothermal synthesis is described.

First, in the solution mixing process, yttrium nitrate, $Y(NO_3)_3$, gadolinium nitrate, $Gd_2(NO_3)_3$; boric acid, $H_3BO_3$; and europium nitrate, $Eu(NO_3)_3$ are mixed at a mole ratio of 1−x:2:x ($0.05 \leq x \leq 0.20$), and a Y and Gd ratio of 65:35. The mixture is then heated for two hours at 1200° C. to 1350° C. in the air, and classified to complete the red phosphor.

Next, $Y_{2-x}O_3:Eu_x$ manufactured using hydrothermal synthesis is described.

First, in the solution mixing process, yttrium nitrate $Y(NO_3)_3$ and europium nitrate $Eu(NO_3)_3$ are mixed, and the mixture is dissolved in ion-exchange water to manufacture a liquid mixture with a mole ratio of 2−x:x ($0.05 \leq x \leq 0.30$).

Next, in the hydration process, the basic aqueous solution (e.g. aqueous ammonia) is added to this aqueous solution to manufacture hydrate.

Then, in the hydrothermal synthesis process, this hydrate and ion-exchange water are poured into a container made of corrosion-resistant and heat resistant material such as Pt and Au. Hydrothermal synthesis is conducted at 100° C. to 300° C. under a pressure 0.2 MPa to 10 MPa for 3 to 12 hours in a pressurized container typically using an autoclave to manufacture a compound. This compound is then dried to manufacture intended phosphor $Y_{2-x}O_3:Eu_x$.

Then, this phosphor is annealed at 1300° C. to 1400° C. for two hours in the air, and classified to complete the red phosphor. The diameter of the phosphor obtained in this hydrothermal synthesis process is about 0.1 μm to 2.0 μm and round. This particle diameter and shape are thus appropriate for forming an outstanding phosphor layer.

In the above description, phosphor layers 110R and 110G of PDP100 are made of conventional phosphors. For phosphor layer 110B, a phosphor in which La substitutes for a proportion of Ba and Sr composing the phosphor is used. With respect to phosphor particles, trivalent Eu ions substitute for a proportion of divalent Eu ions.

Samples applying the above preferred embodiment are manufactured to evaluate the performance of the plasma display device of the present invention.

Experiments are carried out on the performance of the samples and their results are examined.

All the plasma display devices manufactured are 42 inch (HD-TVs with a rib pitch of 150 μm). The thickness of the dielectric glass layer is 20 μm; the MgO protective layer 0.5 μm, and the distance between the display electrode and display scanning electrode 0.08 mm. The discharge gas enclosed in the discharge space is chiefly composed of neon mixed with 5% xenon.

The plasma display devices numbered Specimens 1 and 5 use blue phosphor particles in which trivalent La ions substitute for divalent Ba or Sr ions composing the phosphor.

Plasma display devices numbered Specimens 2 to 4 and 6 to 9 use blue phosphor particles in which trivalent La ions substitute for divalent Ba or Sr ions composing the phosphor, and trivalent Eu ions substitute for divalent Eu ions. Table 1 shows the synthesis conditions for each specimen.

Specimens 1 to 4 use $(Y, Gd)_{1-x}BO_3:Eu_x$ as the red phosphor, $Zn_{2-x}SiO_4:Mn_x$ as the green phosphor, and $Ba_{(1-x-z)}Eu_xLa_zMgAl_{10}O_{17}$ as the blue phosphor. In Specimens 1 to 4, synthesis method; ratio of substitution for Eu and Mn which are the luminescence centers, i.e., the substitution ratio of Eu for Y and Ba elements, substitution ratio of Mn for Zn element; and ion content of trivalent Eu ions that substitute for divalent Eu ions, are changed as shown in Table 1.

Specimens 5 to 9 use $Y_{2-x}O_3:Eu_x$ as the red phosphor, $Ba_{1-x}Al_{12}O_{19}:Mn_x$ as the green phosphor, and $Ba_{(1-x-y-z)}Eu_xSr_yLa_zMgAl_{10}O_{17}$ as the blue phosphor. In Specimens 5 to 9, conditions for each phosphor synthesis method; ratio of substitution for the luminescence center, substitution amount of La for Ba or Sr composing the blue phosphor; and ion content of trivalent Eu ions that substitute for divalent Eu ions, are changed as shown in Table 1.

TABLE 1

| | Blue phosphor $Ba_{(1-x-z)}Eu_xLa_zMgAl_{10}O_{17}$ | | | | Red phosphor $(Y,Gd)_{1-x}BO_3:Eu_x$ | | Green phosphor $(Zn_{1-x}Mn_x)_2SiO_4$ | |
|---|---|---|---|---|---|---|---|---|
| Specimen No. | Eu amount x | Mfg. method | La substitution amount for Ba (z) | Trivalent Eu ion content to divalent Eu | Eu amount x | Mfg. method | Mn amount x | Mfg. method |
| 1 | x = 0.03 | Hydrothermal synthesis | 0.2 (20%) | 0.00% | x = 0.1 | Solid-phase reaction | x = 0.01 | Atomization |

TABLE 1-continued

| Specimen No. | x Sr amount y | Mfg. method | La substitution amount for Ba (z) | Trivalent Eu ion content to divalent Eu | Red phosphor $(Y_{1-x})_2O_3:Eu_x$ Eu amount x | Red phosphor Mfg. method | Green phosphor $Ba_{1-x}Al_{12}O_{19}:Mn_x$ Mn amount x | Green phosphor Mfg. method |
|---|---|---|---|---|---|---|---|---|
| 2 | x = 0.05 | Solid-phase reaction (flux method) | 0.1 (10%) | 5.00% | x = 0.2 | Atomization | x = 0.02 | Hydrothermal synthesis |
| 3 | x = 0.1 | Atomization | 0.05 (5%) | 20.00% | x = 0.3 | Aqueous solution | x = 0.05 | Solid-phase reaction |
| 4 | x = 0.2 | Aqueous solution | 0.001 (0.1%) | 40.00% | x = 0.15 | Hydrothermal synthesis | x = 0.1 | Solid-phase reaction |
| 5 | x = 0.03 y = 0.1 | Solid-phase reaction (flux method) | 0.2 (20%) | 0.00% | x = 0.01 | Hydrothermal synthesis | x = 0.01 | Hydrothermal synthesis |
| 6 | x = 0.1 y = 0.3 | Hydrothermal synthesis | 0.1 (10%) | 5.00% | x = 0.1 | Atomization | x = 0.02 | Atomization |
| 7 | x = 0.1 y = 0.5 | Atomization | 0.05 (5%) | 15.00% | x = 0.15 | Aqueous solution | x = 0.05 | Solid-phase reaction |
| 8 | x = 0.2 y = 0.3 | Solid-phase reaction | 0.01 (1%) | 20.00% | x = 0.2 | Solid-phase reaction | x = 0.1 | Solid-phase reaction |
| 9 | x = 0.2 y = 0.3 | Solid-phase reaction | 0.001 (0.1%) | 40.00% | x = 0.2 | Solid-phase reaction | x = 0.1 | Solid-phase reaction |
| 10* | x = 0.1 y = 0.5 | Solid-phase reaction | 0.35 (35%) | 60.00% | x = 0.15 | Aqueous solution | x = 0.01 | Hydrothermal synthesis |
| 11* | x = 0.1 y = 0.5 | Solid-phase reaction | none | none | x = 0.15 | Aqueous solution | x = 0.01 | Hydrothermal synthesis |

*Specimens 10 and 11 are Comparisons.

The phosphor ink used for forming the phosphor layer is made by mixing phosphor with the phosphor particles shown in Table 1, resin, solvent, and dispersing agent. The measured viscosity (at 25° C.) of the phosphor ink is between 1500 CP to 3000 CP for all specimens. The observation of the formed phosphor layer reveals that the phosphor ink was uniformly applied to the barrier rib wall without clogging during 200-hr continuous application.

In all specimens, phosphor particles of each color in the phosphor layer have an average particle diameter of 0.1 μm to 3.0 μm and maximum particle diameter of 8 μm.

Specimen 10 uses the blue phosphor particles of which La substitutes for 35% of Ba and trivalent Eu ions account for 60%. The phosphor particles of each color in Specimen 11 contain the conventional blue phosphor particle without substitution of La or oxidization of Eu.

Divalent and trivalent Eu ions in Table 1 are measured using XANES (X-ray Absorption Near Edge Structure) spectrum method.

(Experiment 1)

Luminance and change in luminance of the blue phosphor of Specimens 1 to 9 and Comparisons 10 and 11 are measured after the phosphor-firing step (at 520° C. for 20 hr), and then irradiation of 147 nm ultraviolet rays (using HD0012 excimer lamp, Ushio Corporation) for 100 hours in the rear panel manufacturing process.

(Experiment 2)

Luminance and change in deterioration of luminance of the blue phosphor are measured while lighting the panel with each color. Discharge maintenance pulses of 200 V and 100 kHz are applied continuously to the plasma display device for 100 hours, and the panel luminance is measured before and after applying the pulses. The rate of change in deterioration of luminance [(luminance before pulse application−luminance after pulse application)/luminance before pulse application×100]] is calculated from the measured values.

(Experiment 3)

Luminance when only blue is lighted over the entire face of the panel is measured while applying 180 V and 50 kHz to the display electrodes of the plasma display device.

An address error at address discharge of the plasma display device is visually determined by whether flickering exists in the displayed image. If there is flickering even at one point, it is determined as the presence of an address error.

Table 2 shows luminance and change in deterioration of luminance of the blue phosphor layer in Specimens 1 to 3.

As shown in Table 2, Comparisons 10 and 11 in which La does not substitute for Ba in the blue phosphor, and Specimen 11 in which trivalent Eu ions do not substitute for divalent Eu ions show a large rate of deterioration of luminance when 147-nm ultraviolet rays or the maintenance discharge (pulses of 200 V at 100 kHz for 100 hours) are applied. Specimen 10, in which La substitutes for 35% of Ba, and trivalent Eu ions substitute for 60% of divalent Eu ions, shows relatively small change in luminance but the luminance of single blue color drops significantly.

In Specimens 1 to 9, the rate of change in blue due to application of 147-nm ultraviolet rays was 3.5% or less in every case, and no address errors are found.

This is because oxygen defects (in particular near Ba—O) in the blue phosphor are significantly reduced by making trivalent La ions substitute for a proportion of divalent Ba or Sr ions and trivalent Eu ions substitute for a proportion of divalent Eu ions. Accordingly, water or hydrocarbon system gas in the surrounding atmosphere when firing the phosphor, MgO during panel sealing, or water and hydrocarbon system gas generated from barrier rib, sealing frit, or phosphor do not adsorb on the phosphor surface, and create a defect layer (oxygen defect near the Ba—O layer).

Less adsorption of water and hydrocarbon system gas improves the adsorption of ethylcellulose in the phosphor ink to the phosphor, eliminating nozzle clogging.

at 60° C. for 10 minutes, and then dried at 100° C. Thermal Desorption Spectroscopy analysis is then applied to this phosphor. Results reveal that the peak of physical adsorption (around 100° C.) and chemical adsorption (300° C. to 500° C.) of water to be 15 times greater than that in the samples (Specimens 1 to 10) where substitution is applied.

The blue phosphor of the present invention is also applicable to fluorescent lamps, which emit light as a result of being excited by ultraviolet rays. In this case, La ions substitute for divalent Ba ions, and trivalent Eu ions substitute for divalent Eu ions present in conventional blue phosphor particles applied to the inner wall of a fluorescent tube. Application of the present invention to fluorescent lamps would achieve better luminance and less deterioration of luminance than seen in conventional fluorescent lamps.

INDUSTRIAL APPLICABILITY

The present invention makes La substitute for a proportion of Ba or Sr and trivalent Eu ions substitute for a

TABLE 2

| Specimen No. | Luminance deterioration rate of blue color (%) after applying 147 nm UV rays for 100 hours Blue | Pulse luminance change rate (%) after applying discharge maintenance pulse of 200 V, 100 kHz for 100 hr Blue | Address error at address discharge and nozzle clogging | Luminance at lighting blue color over the entire panel cd/cm$^2$ |
|---|---|---|---|---|
| 1 | −3.5 | −0.4 | none | 98.2 |
| 2 | −2.5 | −0.3 | none | 97.4 |
| 3 | −2.2 | −0.4 | none | 94.5 |
| 4 | −1.5 | −0.2 | none | 93.8 |
| 5 | −3.3 | −0.2 | none | 98.5 |
| 6 | −2.6 | −0.3 | none | 97 |
| 7 | −2.0 | −0.5 | none | 96.5 |
| 8 | −1.1 | −0.2 | none | 94 |
| 9 | −3.5 | −0.4 | none | 92.8 |
| 10* | −4.0 | −0.5 | none | 55.1 |
| 11* | −40.5 | −35 | yes | 45.8 |

*Specimens 10 and 11 are Comparisons.

Moreover, conventional blue phosphor is found to have a greater level of deterioration in each process and by 147-nm ultraviolet rays, compared to the blue phosphor of the present invention. This tends to reduce the color temperature of white when all three colors are simultaneously illuminated.

To improve the color temperature of white display, in conventional plasma display devices, the luminance of phosphor cells (red and green) other than blue is reduced by circuitry. However, in the blue phosphor manufactured using the method of the present invention, the luminance of the blue cell increases (shows no decline), and deterioration during panel manufacturing processes and deterioration due to 147-nm ultraviolet rays are also reduced. Accordingly, the need to deliberately reduce the luminance of cells for other colors is eliminated, allowing the full luminance of all color cells to be used. The luminance of the plasma display device can thus be increased while maintaining a high color temperature for the white display.

(Experiment 4)

As a model experiment, blue phosphor in which divalent Ba ions are not substituted by trivalent La ions and a proportion of divalent Eu ions is not substituted by trivalent Eu ions (Specimen 11) is shelved in a 90% RH atmosphere proportion of divalent Eu ions in the blue phosphor. This prevents deterioration of the phosphor layer during the manufacturing processes, and improves the luminance, service life, and reliability of PDPs and fluorescent lamps.

The invention claimed is:

1. A plasma display device comprising a plasma display panel on which a plurality of discharge cells for one of single and multiple colors are disposed and a color phosphor layer corresponding to each of the discharge cells is disposed;
   wherein the phosphor layer has a blue phosphor layer, the blue phosphor layer being composed of blue phosphor having a crystal structure of one of $Ba_{(1-x)}Eu_xMgAl_{10}O_{17}$ (0<x<1) and $Ba_{(1-x-y)}Eu_xSr_yMgAl_{10}O_{17}$ (0<x<1, 0<y<1, and 0<x+y<1) in which La substitutes for a proportion of one of Ba and Sr.

2. The plasma display device as defined in claim 1, wherein amount of substitution of La for one of Ba and Sr is between 0.1% and 20%.

3. The plasma display device as defined in claim 1, wherein the blue phosphor is composed of a compound of one of $Ba_{(1-x-z)}Eu_xLa_zMgAl_{10}O_{17}$ (0<x<1, 0<z<1, and 0<x+z<1) and $Ba_{(1-x-y-z)}Eu_xSr_yLa_zMgAl_{10}O_{17}$ (0<x<1, 0<y<1, 0<z<1, and 0<x+y+z<1), and trivalent Eu ions substitute for a proportion of divalent Eu ions in these compounds.

4. The plasma display device as defined in claim 3, wherein a divalent Eu ion content is 60% to 95%, and a trivalent Eu ion content is 5% to 40%.

5. A blue phosphor which emits visible light as a result of being excited by ultraviolet rays, the blue phosphor having a crystal structure of one of $Ba_{(1-x)Eux}MgAl_{10}O_{17}$ (0<x<1) and $Ba_{(1-x-y)}Eu_xSr_yMgAl_{10}O_{17}$ (0<x<1, 0<y<1, and 0<x+y<1) in which La substitutes for a proportion of one of Ba and Sr.

6. The blue phosphor as defined in claim 5, wherein amount of substitution of La for one, of Ba and Sr is between 0.1% and 20%.

7. A blue phosphor which emits visible light as a result of being excited by ultraviolet rays, the blue phosphor having a crystal structure of one of $Ba_{(1-x)}Eu_xMgAl_{10}O_{17}$ (0<x<1) and $Ba_{(1-x-y)}Eu_xSr_yMgAl_{10}O_{17}$ (0<x<1, 0<y<1, and 0<x+y<1) in which La substitutes for a proportion of one of Ba and Sr and trivalent Eu ions substitute for a proportion of divalent Eu ions.

8. The blue phosphor as defined in claim 7, wherein a divalent Eu ion content is 60% to 95%, and a trivalent Eu ion content is 5% to 40%.

9. The blue phosphor as defined in claim 7 wherein amount of substitution of La for one of Ba and Sr is between 0.1% and 20%.

10. A method of manufacturing a blue phosphor comprising a step of firing the blue phosphor in an oxidative atmosphere, the blue phosphor being composed of one of $Ba_{(1-x-z)}Eu_xLa_zMgAl_{10}O_{17}$ (0<x<1, 0<z<1, and 0<x+z<1) and $Ba_{(1-x-y-z)}Eu_xSr_yLa_zMgAl_{10}O_{17}$ (0<x<1, 0<y<1, 0<z<1, and 0<x+y+z<1) which have divalent Eu ions in a ground material;

wherein the blue phosphor is fired in an oxidative atmosphere so as to change a proportion of divalent Eu ions to trivalent Eu ions.

11. The method of manufacturing a blue phosphor as defined in claim 10 wherein the oxidative atmosphere in the step of firing in an oxidative atmosphere is one of $O_2$, $O_2-N_2$, and $O_3-N_2$, and a firing temperature is 350° C. to 900° C.

* * * * *

UNITED STATES PATENT AND TRADEMARK OFFICE
CERTIFICATE OF CORRECTION

PATENT NO. : 7,067,969 B2  Page 1 of 1
APPLICATION NO. : 10/485149
DATED : June 27, 2006
INVENTOR(S) : Masaki Aoki et al.

It is certified that error appears in the above-identified patent and that said Letters Patent is hereby corrected as shown below:

ON THE TITLE PAGE

In Item 56, "References Cited", under "OTHER PUBLICATIONS", in line 3, please replace "H. Kijima," with --N. Kijima,--.

IN THE CLAIMS

In column 15, line 6, please replace "$Ba_{(1-x)Eux}$" with --$Ba_{(1-x)}Eu_x$--.

In column 15, line 11, please replace "for one, of" with --for one of--.

In column 16, line 1, please replace "claim 7 wherein" with --claim 7, wherein--.

In column 16, line 15, please replace "claim 10 wherein" with --claim 10, wherein--.

Signed and Sealed this

Sixth Day of March, 2007

JON W. DUDAS
*Director of the United States Patent and Trademark Office*